United States Patent
Wei

(10) Patent No.: US 12,255,475 B2
(45) Date of Patent: Mar. 18, 2025

(54) CHARGER

(71) Applicant: Shudong Wei, Shenzhen (CN)

(72) Inventor: Shudong Wei, Shenzhen (CN)

(*) Notice: Subject to any disclaimer, the term of this patent is extended or adjusted under 35 U.S.C. 154(b) by 0 days.

(21) Appl. No.: 18/822,511

(22) Filed: Sep. 3, 2024

(65) Prior Publication Data

US 2024/0429723 A1    Dec. 26, 2024

(51) Int. Cl.
    *H02J 7/00* (2006.01)
    *H02G 11/00* (2006.01)
    *H02J 7/14* (2006.01)

(52) U.S. Cl.
    CPC .......... *H02J 7/0042* (2013.01); *H02G 11/006* (2013.01)

(58) Field of Classification Search
CPC ...... H02J 7/0042; H02J 7/0044; H02J 7/0045; H02J 7/0047; H02J 7/0048
USPC ........................................................ 320/109
See application file for complete search history.

(56) References Cited

U.S. PATENT DOCUMENTS

| | | | | |
|---|---|---|---|---|
| 9,153,986 | B1* | 10/2015 | Herr .................... | H01R 13/6205 |
| 9,917,453 | B1* | 3/2018 | Banon .................... | H02J 7/0042 |
| 12,095,295 | B1* | 9/2024 | Wang .................... | H02J 7/0042 |
| 2005/0085122 | A1 | 4/2005 | Chiou | |
| 2015/0028797 | A1* | 1/2015 | Miller .................... | H02J 7/1423 |
| | | | | 320/103 |
| 2015/0188303 | A1* | 7/2015 | Hinojosa ............ | B65H 75/4434 |
| | | | | 242/389 |
| 2015/0349555 | A1* | 12/2015 | Ortiz Baeza .......... | H02J 7/0042 |
| | | | | 320/111 |
| 2016/0164325 | A1* | 6/2016 | Hinojosa ............... | H02J 7/0042 |
| | | | | 320/107 |
| 2016/0226279 | A1* | 8/2016 | Anderson ............. | H02J 7/0049 |
| 2016/0276856 | A1* | 9/2016 | Miller .................... | H02J 7/0042 |
| 2016/0380446 | A1* | 12/2016 | Loewen .................... | H02J 7/00 |
| | | | | 320/107 |
| 2017/0047753 | A1* | 2/2017 | Precheur ............... | H02J 7/0044 |
| 2018/0269672 | A1* | 9/2018 | Ebrahimi Afrouzi ....................... | |
| | | | | B65H 75/4471 |
| 2019/0140461 | A1* | 5/2019 | Adam .................... | H02J 7/0013 |
| 2019/0363553 | A1* | 11/2019 | Clark ....................... | H05K 5/00 |
| 2020/0373715 | A1* | 11/2020 | Dipalma ........... | H04M 1/72409 |
| 2020/0388972 | A1* | 12/2020 | Byrne .................... | H01R 31/06 |

(Continued)

OTHER PUBLICATIONS

Minlu, "Multi Charging Cable, 2Pack 5 in 1 Retractable Lightning Chrger Cable 60W Fast Charging & Data Sync, Retractable Charging Cord Multi Car Charger for iPhone 16/15/14/13 iPads Samsung S24 S23 Tablets" Jun. 10, 2023. Amazon.com https://shorturl.at/mBpu8 (Year: 2023).*

*Primary Examiner* — Alexis B Pacheco
(74) *Attorney, Agent, or Firm* — JEEN IP LAW, LLC

(57) ABSTRACT

The present disclosure discloses a charger, including a shell, at least one stretchable cable assembly, and a charging head assembly. The shell includes an annular shell, a surface shell arranged at a top of the annular shell, and a bottom shell arranged at a bottom of the annular shell; the annular shell, the surface shell, and the bottom shell are enclosed to form an accommodating chamber; a cable accommodating slot is further provided in the accommodating chamber; the stretchable cable assembly is arranged in the cable accommodating slot; the annular shell is provided with a cable outlet hole; a cable of the stretchable cable assembly extends or retracts along the cable outlet hole; the charging head assembly is arranged in the accommodating chamber.

15 Claims, 16 Drawing Sheets

(56) References Cited

U.S. PATENT DOCUMENTS

| | | | |
|---|---|---|---|
| 2021/0265828 A1* | 8/2021 | Fan | H02J 7/0042 |
| 2022/0060045 A1 | 2/2022 | Imoto et al. | |
| 2022/0200298 A1* | 6/2022 | Brier | H02J 7/0014 |
| 2022/0267205 A1* | 8/2022 | Chien | C03C 3/097 |
| 2023/0042579 A1 | 2/2023 | Mou | |
| 2024/0154437 A1* | 5/2024 | James | H02J 7/0045 |

* cited by examiner

CHARGER

TECHNICAL FIELD

The present disclosure relates to the technical field of charging devices, and in particular, to a charger.

BACKGROUND

With the development of society, mobile terminals such as mobile phones have become essential tools for information exchange, so that various types of chargers have emerged, to facilitate charging of the mobile phones. Consumers generally use a charging head and a USB cable to charge a mobile phone or another device.

However, at present, most USB cables on the market are connected to charging heads. As the USB cable generally has a length of about one meter, whether in an office environment or at home, the USB cable makes the environment disordered. Moreover, the USB cable is easily damaged, and property loss and potential safety hazard are brought to users.

Therefore, the present disclosure provides a charger that can effectively solve the above-mentioned problems. The charger has a simple structure, is provided with a stretchable cable, and is convenient for use and storage.

SUMMARY

To overcome the shortcomings in the prior art, the present disclosure provides a charger which has a simple structure, is provided with a stretchable cable, and is convenient for use and storage.

The technical solution used in the present disclosure to solve the technical problems is as follows:

A charger includes:
  a shell, wherein the shell includes an annular shell, a surface shell arranged at a top of the annular shell, and a bottom shell arranged at a bottom of the annular shell; the annular shell, the surface shell, and the bottom shell are enclosed to form an accommodating chamber; a cable accommodating slot is further provided in the accommodating chamber;
  at least one stretchable cable assembly, wherein the stretchable cable assembly is arranged in the cable accommodating slot; the annular shell is provided with a cable outlet hole; a cable of the stretchable cable assembly extends or retracts along the cable outlet hole; and
  a charging head assembly, wherein the charging head assembly is arranged in the accommodating chamber; the charging head assembly is electrically connected to the stretchable cable assembly; and a plug of the charging head assembly is configured to be plugged into a socket.

As an improvement of the present disclosure, the stretchable cable assembly further includes a cable shell, a fixed printed circuit board (PCB), and a rotary PCB; the rotary PCB is connected to the cable shell; the cable is wound around the cable shell; a connecting end of the cable is electrically connected to the rotary PCB; a free end of the cable extends or retracts along the cable outlet hole; the rotary PCB is electrically connected to the fixed PCB; the fixed PCB is electrically connected to the charging head assembly; and when the cable extends or retracts along the cable outlet hole, the cable shell and the rotary PCB rotate relative to the fixed PCB.

As an improvement of the present disclosure, the stretchable cable assembly further includes an elastic member; the annular shell is provided with a connecting column; the cable shell is provided with an elastic member accommodating slot in the middle; the elastic member is arranged in the elastic member accommodating slot; one end of the elastic member is connected to the connecting column, and the other end of the elastic member is connected to the cable shell; and an elastic restoring force of the elastic member drives the cable shell to rotate, so that the cable has a movement trend of retraction along the cable outlet hole.

As an improvement of the present disclosure, the stretchable cable assembly further includes an elastic member cover plate; and the elastic member cover plate is detachably connected to the cable shell and covers the elastic member accommodating slot.

As an improvement of the present disclosure, the shell includes a friction block; the surface shell and/or the bottom shell are provided with a friction piece accommodating slot; the friction block is arranged in the friction piece accommodating slot; and the friction block resists against a surface of the elastic member cover plate.

As an improvement of the present disclosure, the charger further includes a locking member; the locking member is rotatably connected to a bottom wall of the cable accommodating slot; an edge convex block and an inner convex block are arranged on one side of the cable shell facing the bottom wall of the cable accommodating slot; a track is formed between the edge convex block and the inner convex block; and a free end of the locking member is plugged into the track and slides or is positioned in the track.

As an improvement of the present disclosure, a guide convex block and a locking convex block are further arranged on one side of the cable shell facing the bottom wall of the cable accommodating slot; the guide convex block and the locking convex block are spaced apart from each other; the guide convex block and the locking convex block divide the track into an outer track and an inner track; and the free end of the locking member slides in the outer track and/or the inner track.

As an improvement of the present disclosure, a clamping slot is provided at a rear end of the locking convex block; when the elastic restoring force of the elastic member drives the cable shell to rotate, so as to enable the cable to retract along the cable outlet hole; and the free end of the locking member slides into the clamping slot along the outer track, to hinder the cable from retracting along the cable outlet hole.

As an improvement of the present disclosure, a first guide portion is arranged at a front end of the guide convex block; the first guide portion is arranged in a manner of facing the clamping slot; and when the cable extends along the cable outlet hole under the action of an external force, the first guide portion is in contact with the free end of the locking member to drive the free end of the locking member to slide from the clamping slot to the inner track.

As an improvement of the present disclosure, a gap is formed between a rear end of the guide convex block and a front end of the locking convex block; an outer edge of the inner convex block protrudes out of a front side of the gap to form a second guide portion; and when the cable extends along the cable outlet hole under the action of the external force, the second guide portion is in contact with the free end of the locking member to drive the free end of the locking member to slide from the inner track to the outer track.

As an improvement of the present disclosure, the charging head assembly includes a power PCB and a plug the power PCB is electrically connected to the fixed PCB through a PIN; and the plug is electrically connected to the power PCB.

As an improvement of the present disclosure, the charging head assembly further includes a mounting seat; and the plug is rotatably mounted on the mounting seat.

As an improvement of the present disclosure, several conductive spring pieces are arranged on the rotary PCB; the conductive spring pieces are arranged radially along the cable shell; concentric circular-ring-shaped conductive contacts are arranged on the fixed PCB; and the conductive spring pieces resist against and are electrically connected to the conductive contacts.

As an improvement of the present disclosure, the charging head assembly further includes an output terminal; and the output terminal is configured to allow insertion and use of a USB cable.

As an improvement of the present disclosure, a data connector is arranged at an end portion of the cable; the data connector includes a first connector and a second connector that is plugged into the first connector; a first end of the first connector is connected to the end portion of the cable; a second end of the first connector is one of a Type-c connector or a Lighting connector; a first end of the second connector is provided with an interface slot adapted to the second end of the first connector; and a second end of the second connector is the other one of the Type-c connector or the Lightning connector.

As an improvement of the present disclosure, the first connector and the second connector are connected by a connecting arm; the first connector is provided with a connecting slot configured to accommodate the connecting arm, so that the connecting arm can slide in the connecting slot.

As an improvement of the present disclosure, the data connector further includes an encloser that sleeves the first connector and the second connector; and the encloser that sleeves the first connector wraps the connecting arm.

As an improvement of the present disclosure, the annular shell is provided with a cable accommodating slot at a position close to the cable outlet hole; and the cable accommodating slot is configured to accommodate the data connector and a portion of the cable.

As an improvement of the present disclosure, a clamping gap is provided at a top of the connecting column; a mounting block is arranged on a side wall of the elastic member accommodating slot; the elastic member is a coil spring; a first end of the coil spring is plugged into the clamping gap; and a second end of the coil spring sleeves the mounting block.

Beneficial effects of the present disclosure are as follows: By the arrangement of the above structure, during use, the plug of the charging head assembly is plugged into the socket to achieve electrical connection with a mains supply. Pulling the cable of the stretchable cable assembly to thread out the cable along the cable outlet hole can extend the cable and facilitate use, and the cable is connected to a mobile terminal or another device to charge the mobile terminal or the another device. During storage, the cable of the stretchable cable assembly retracts along the cable outlet hole, which can effectively store the cable, reduce the volume of the product, and facilitate storage by a user. The problems of cable damage and potential safety hazard caused by a disordered environment and cable winding because of a long cable are avoided.

BRIEF DESCRIPTION OF THE DRAWINGS

For clearer descriptions of the technical solutions according to the embodiments of the present disclosure, the drawings required to be used in the description of the embodiments are briefly introduced below. The drawings in the description below are only some embodiments of the present disclosure, and those skilled in the art that other drawings can be acquired according to the drawings without creative efforts.

The present disclosure will be further explained below in conjunction with the accompanying drawings and embodiments.

DETAILED DESCRIPTION OF THE EMBODIMENTS

Figure 1:
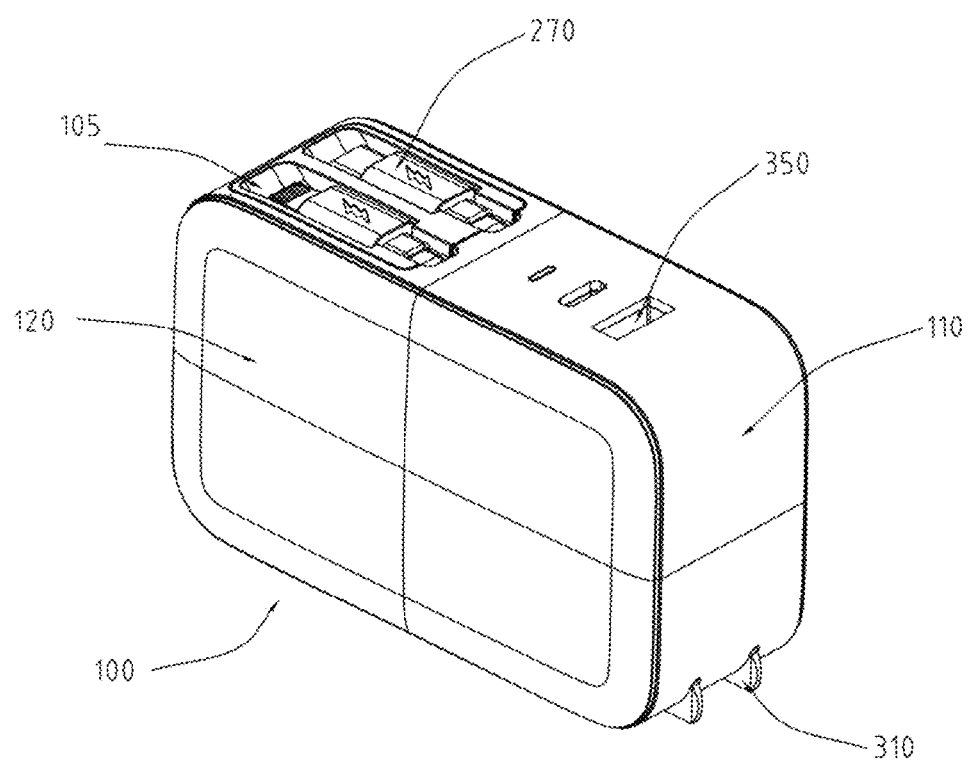
FIG. 1 is a schematic diagram of an overall structure of a charger in a stored state according to a first embodiment of the present disclosure.
Figure 2:
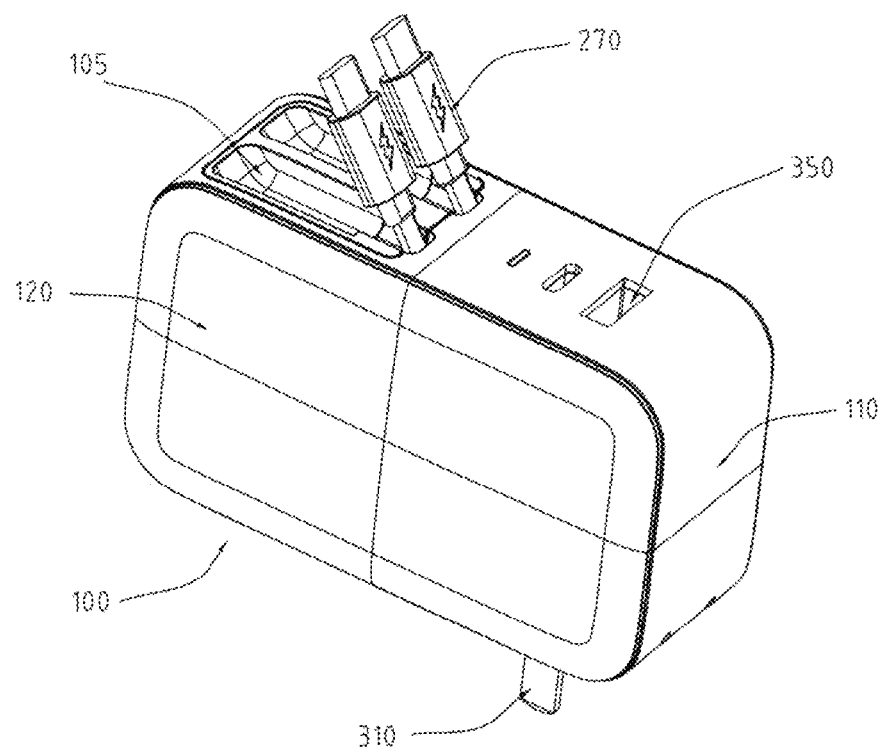
FIG. 2 is a schematic diagram of an entire structure of a charger in a use state in an angle according to a first embodiment of the present disclosure.
Figure 3:
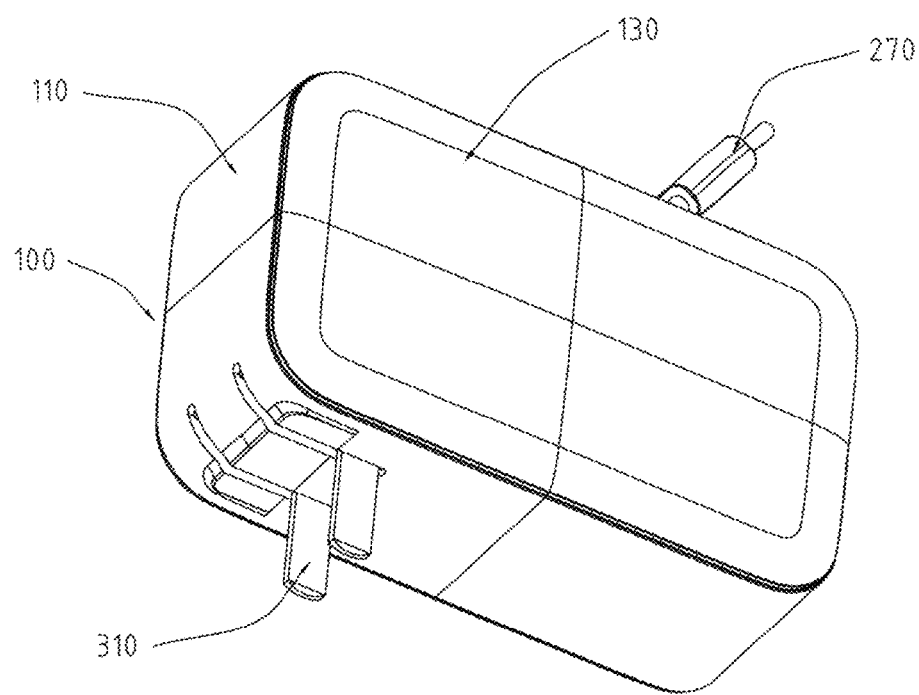
FIG. 3 is a schematic diagram of an entire structure of a charger in a use state in another angle according to a first embodiment of the present disclosure.
Figure 4:
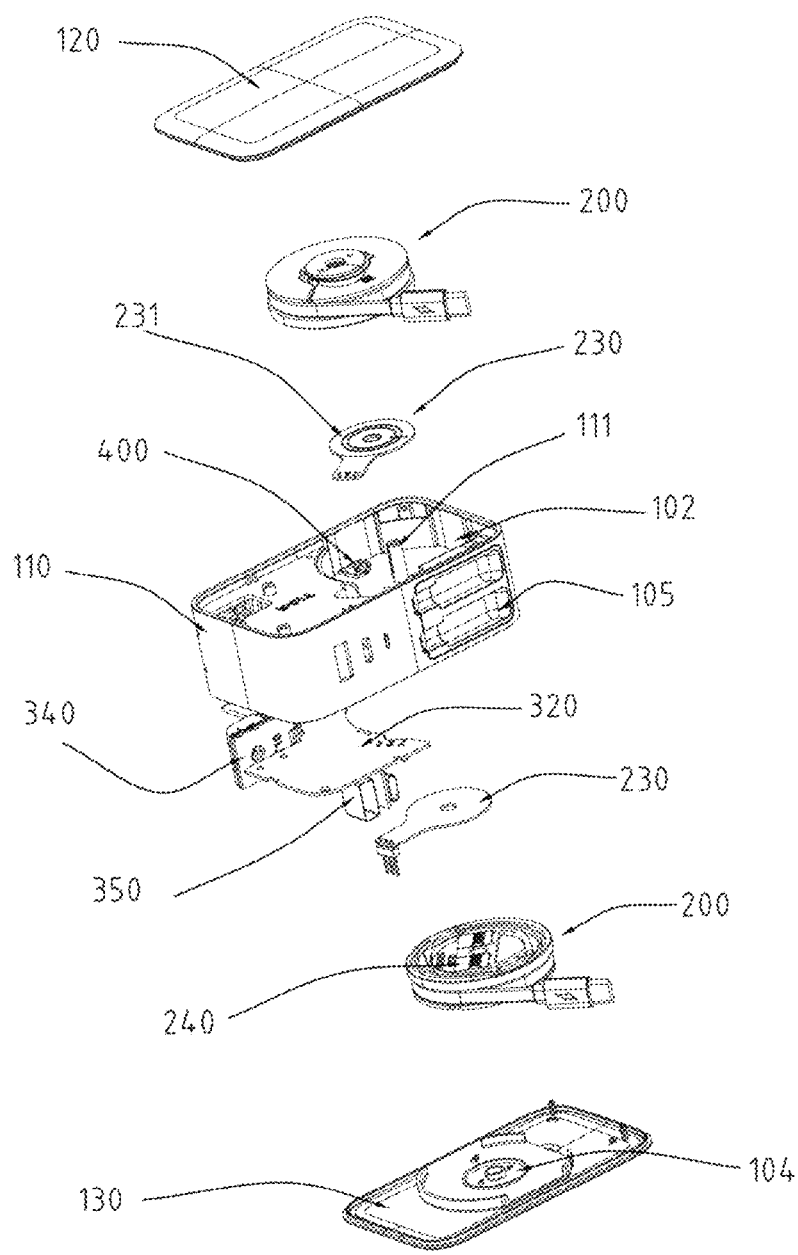
FIG. 4 is a schematic diagram of an exploded structure of a charger in an angle according to a first embodiment of the present disclosure.
Figure 5:
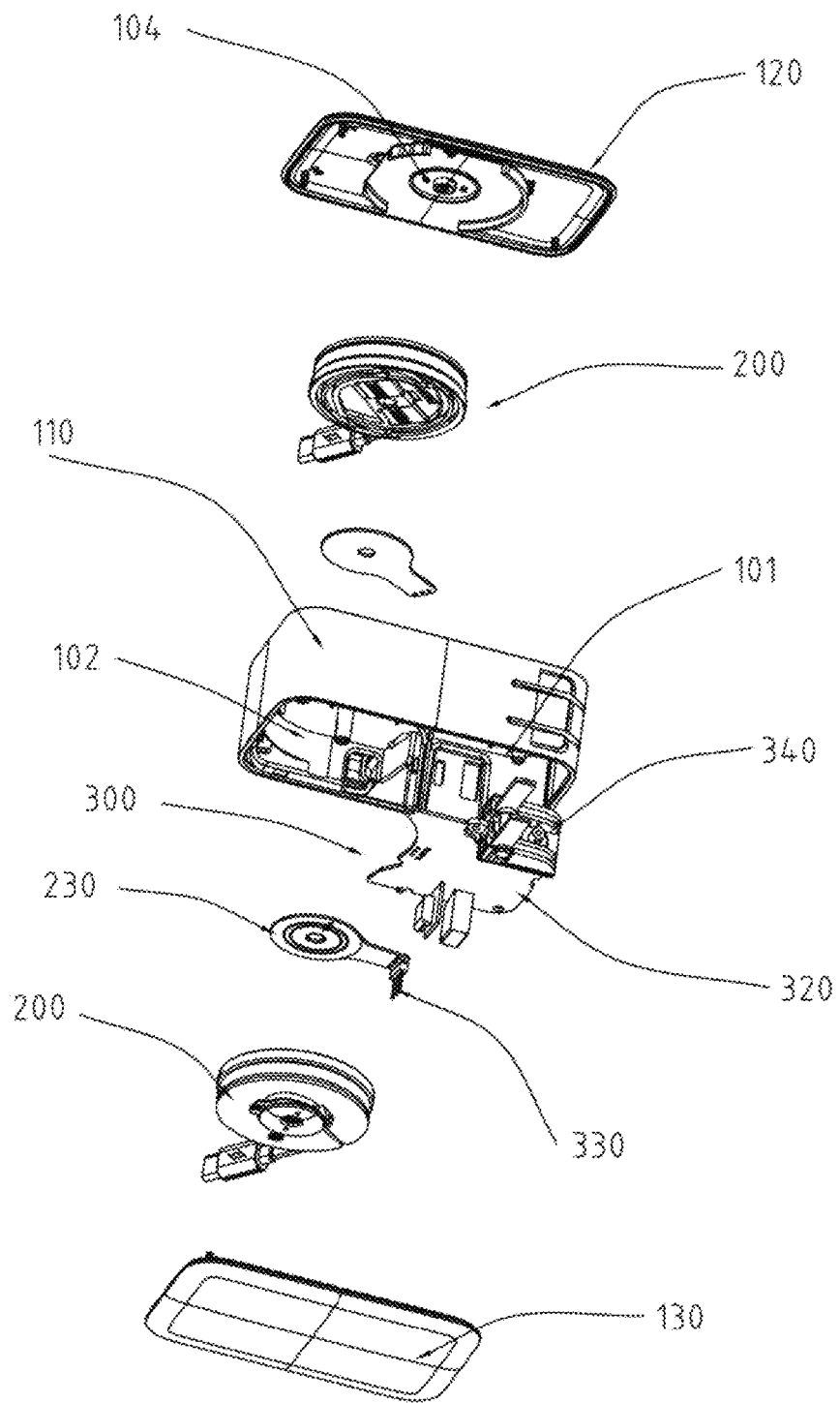
FIG. 5 is a schematic diagram of an exploded structure of a charger in another angle according to a first embodiment of the present disclosure.
Figure 6:
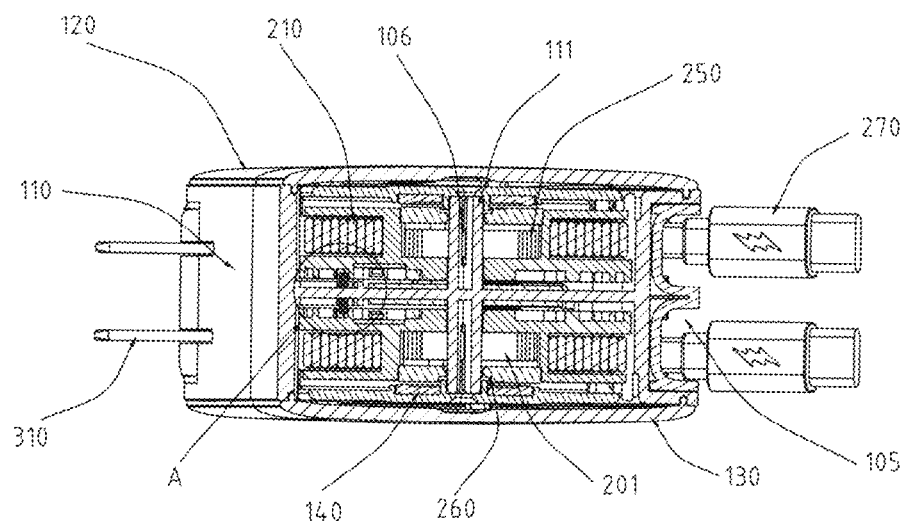
FIG. 6 is a schematic diagram of a first cross-sectional structure of a charger according to a first embodiment of the present disclosure.
Figure 7:
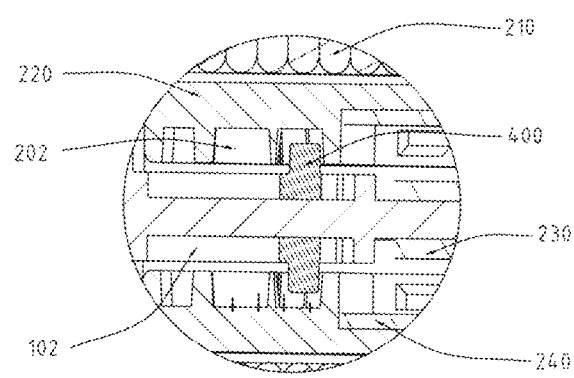
FIG. 7 is an enlarged view of circle A in FIG. 6.
Figure 8:
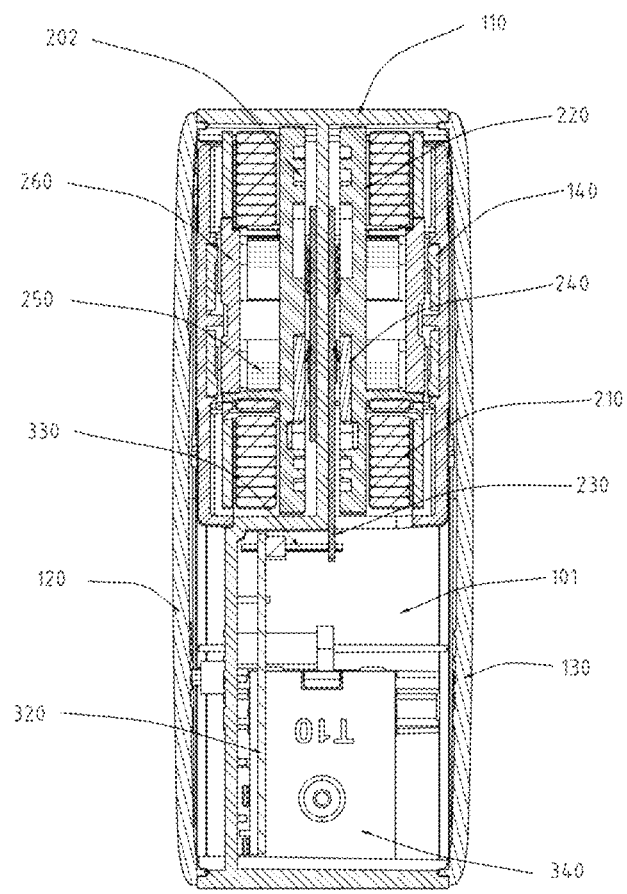
FIG. 8 is a schematic diagram of a second cross-sectional structure of a charger according to a first embodiment of the present disclosure.
Figure 9:
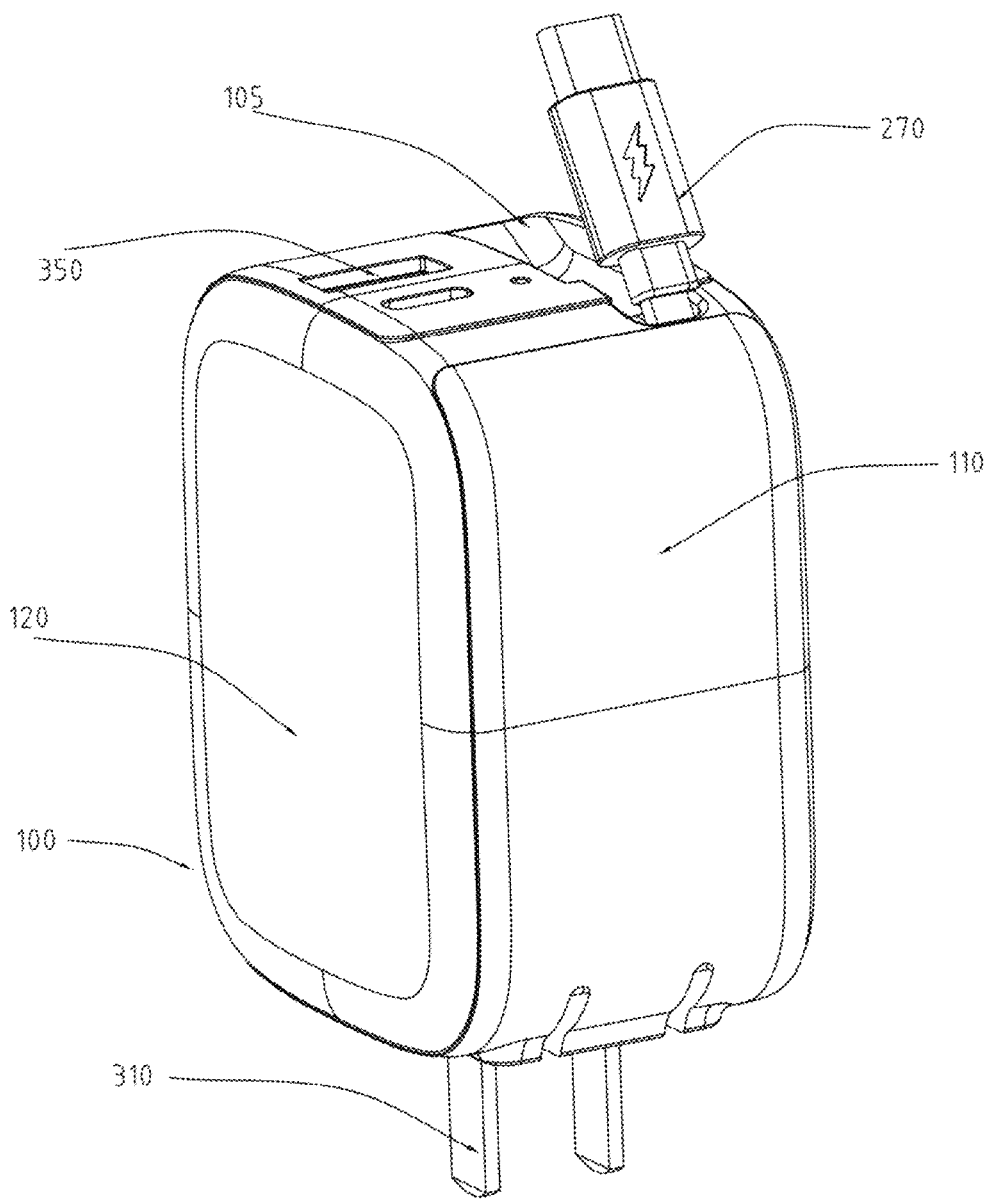
FIG. 9 is a schematic diagram of an entire structure of a charger in a use state according to a second embodiment of the present disclosure.
Figure 10:
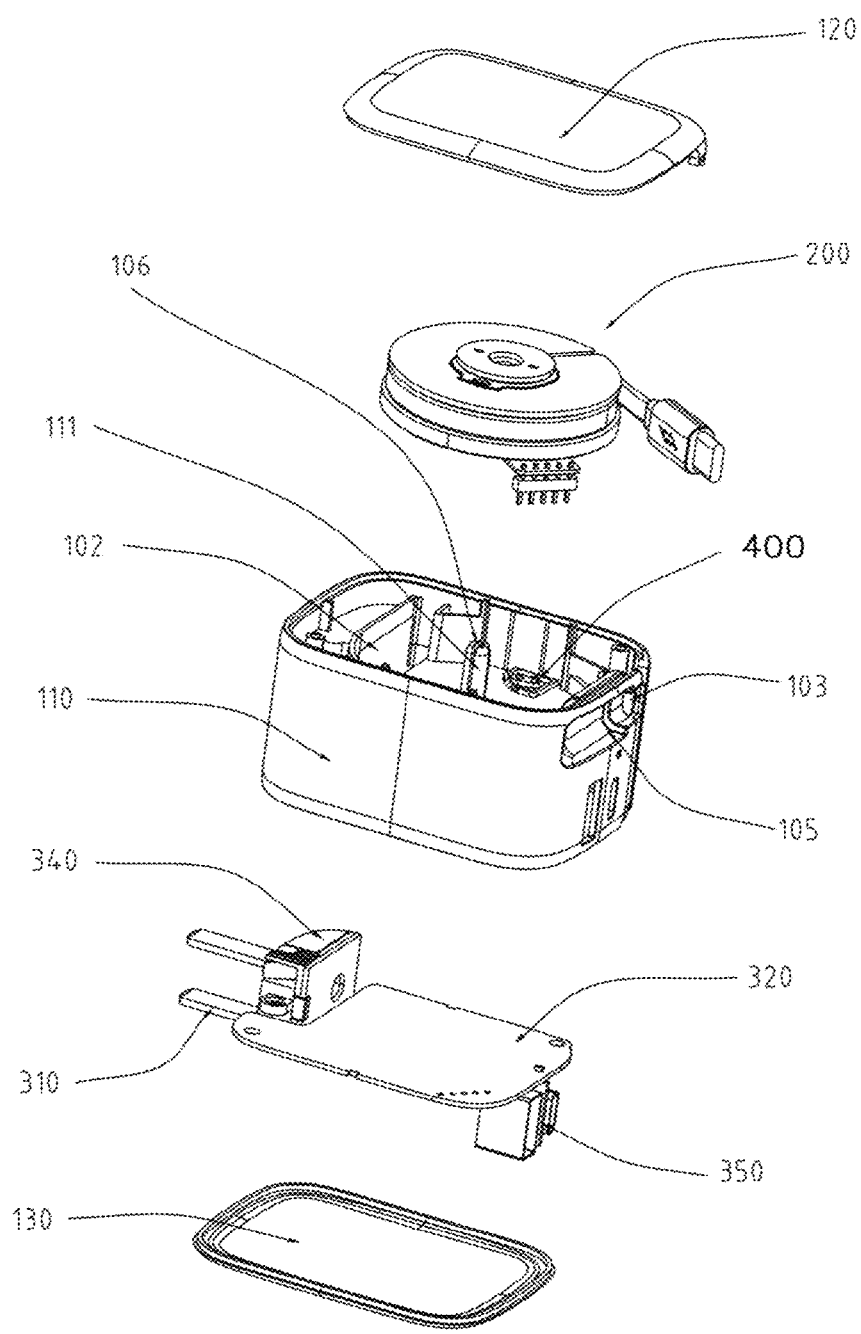
FIG. 10 is a schematic diagram of an exploded structure of a charger according to a second embodiment of the present disclosure.
Figure 11:
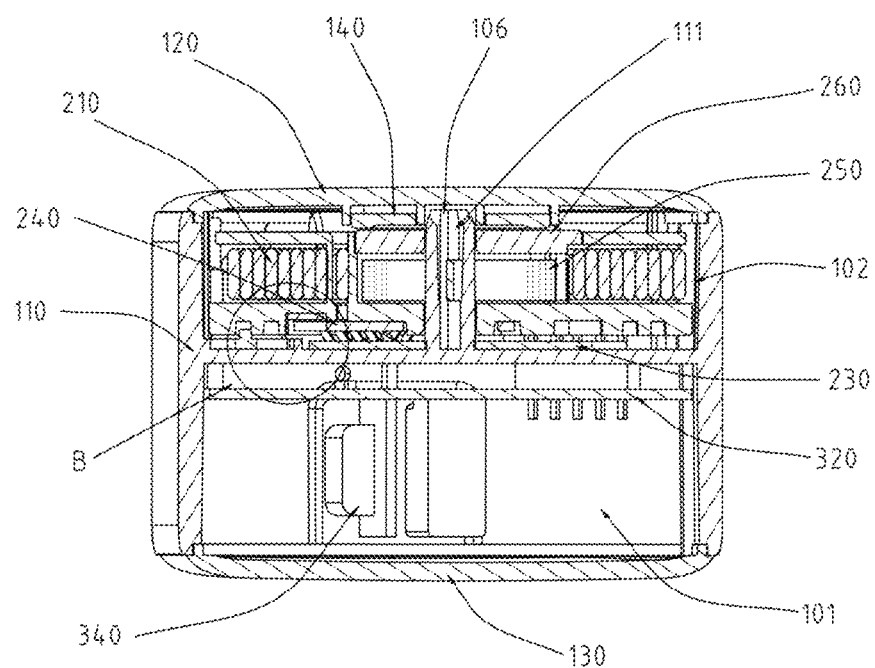
FIG. 11 is a schematic diagram of a cross-sectional structure of a charger according to a second embodiment of the present disclosure.
Figure 12:
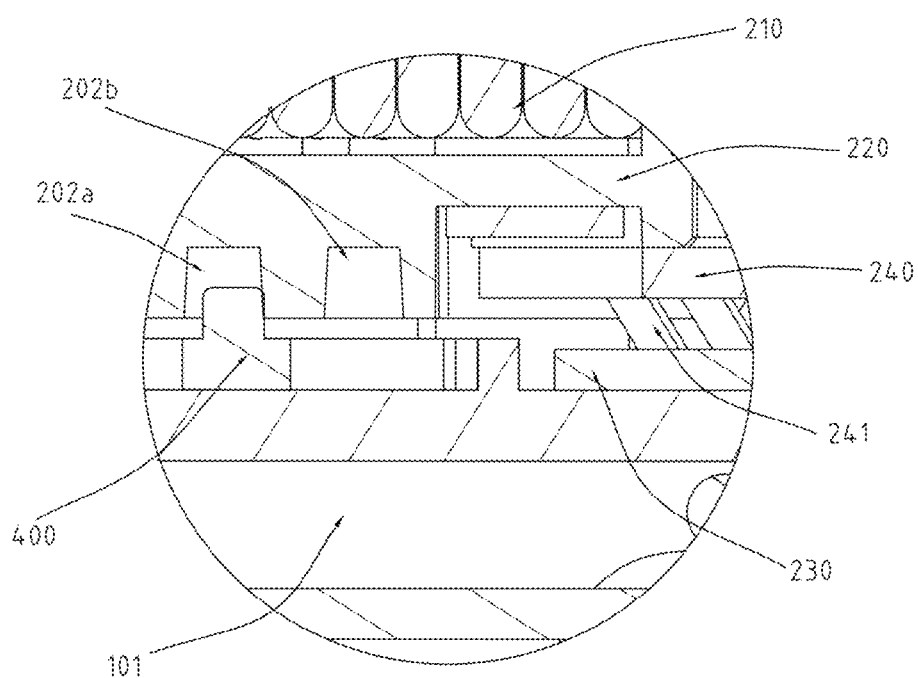
FIG. 12 is an enlarged view of circle B in FIG. 11.
Figure 13:
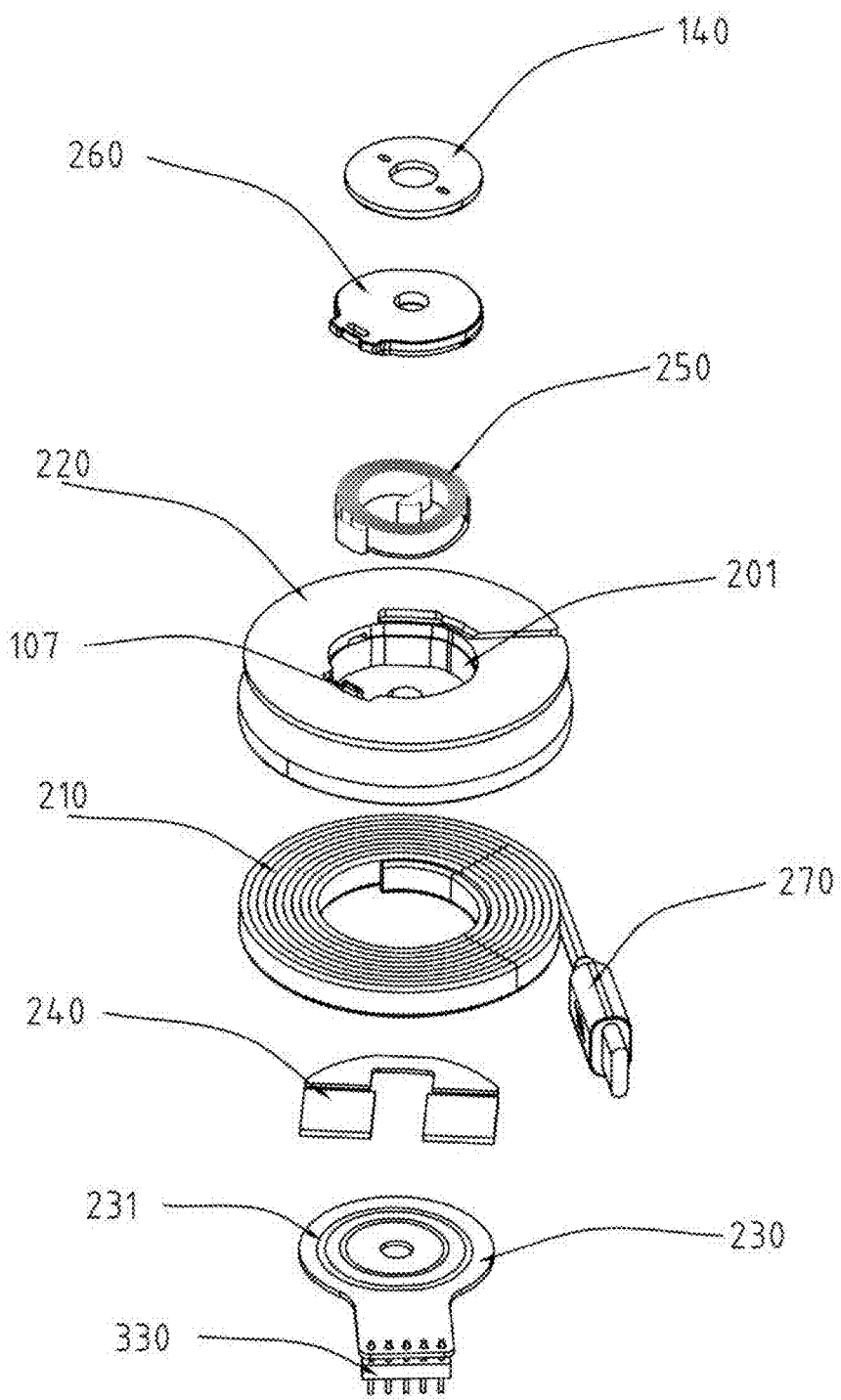
FIG. 13 is a schematic exploded diagram of a stretchable cable assembly in an angle according to the present disclosure.
Figure 14:
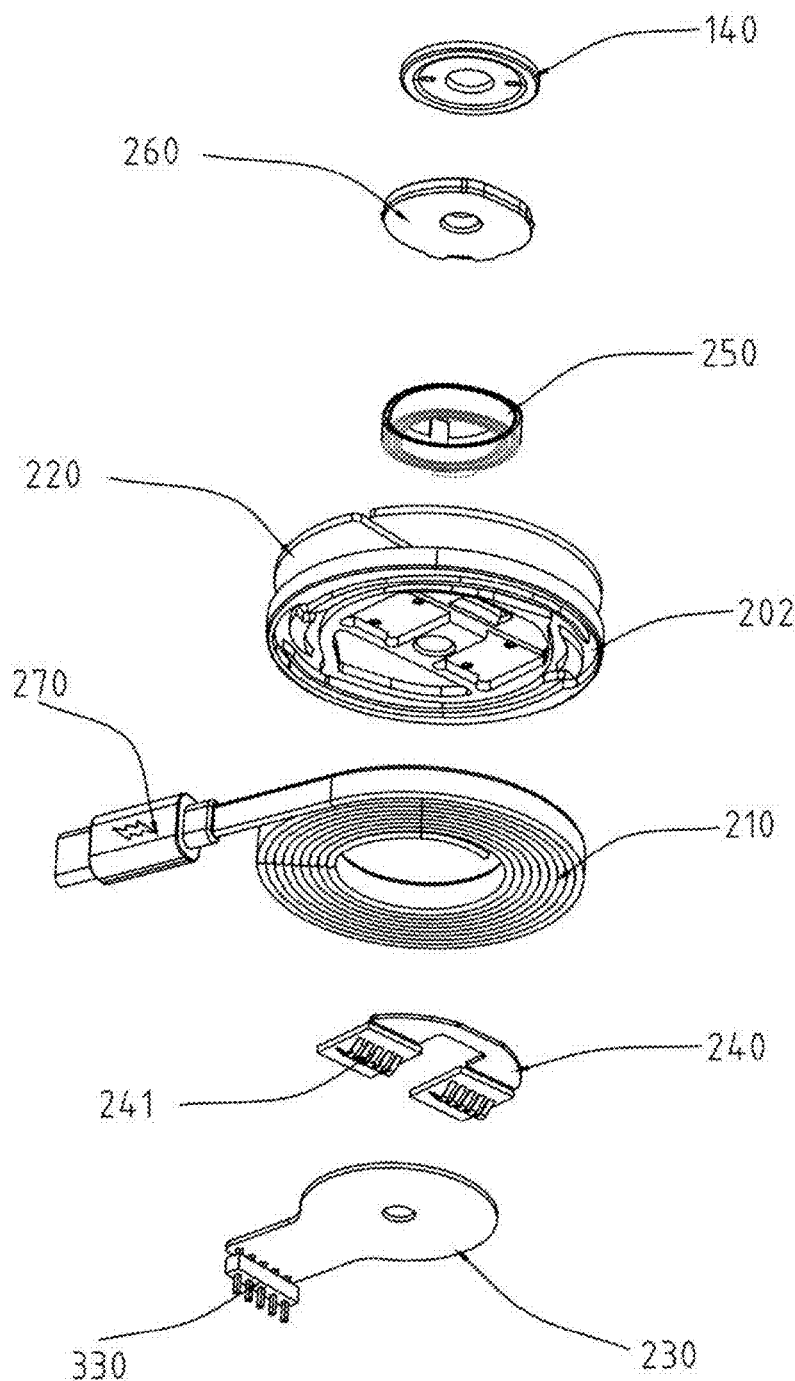
FIG. 14 is a schematic exploded diagram of a stretchable cable assembly in another angle according to the present disclosure.
Figure 15:
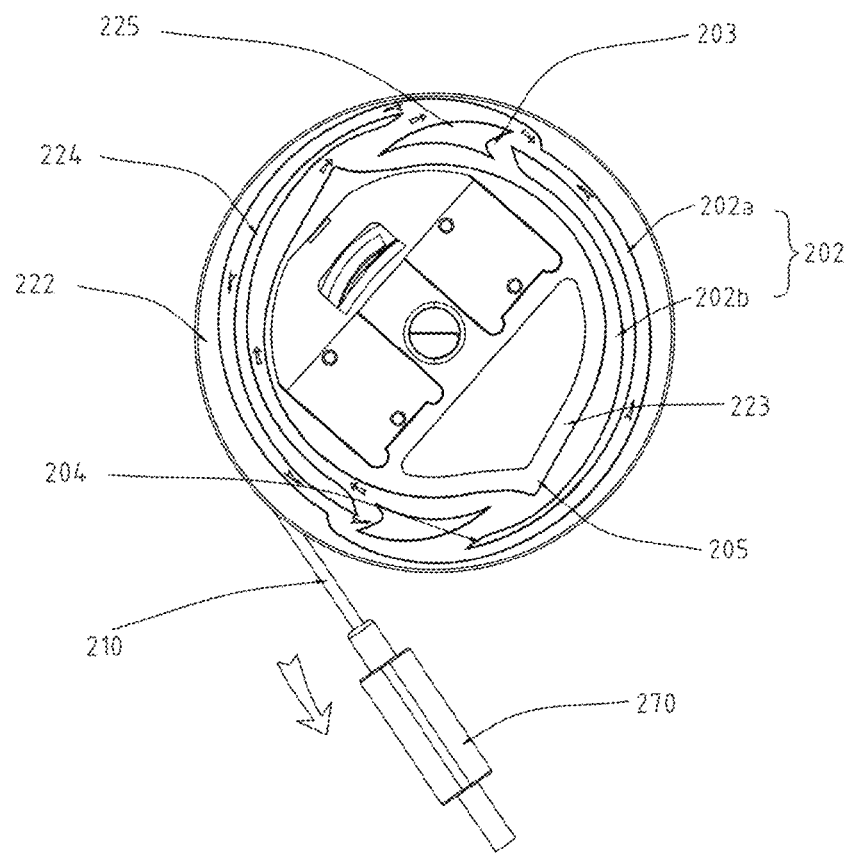
FIG. 15 is a front view of a cable shell according to the present disclosure.

Referring to FIG. 1 to FIG. 8 and FIG. 13 to FIG. 15, a charger according to a first embodiment of the present disclosure is disclosed, including:

a shell 100, wherein the shell 100 includes an annular shell 110, a surface shell 120 arranged at a top of the annular shell 110, and a bottom shell 130 arranged at a bottom of the annular shell 110; the annular shell 110, the surface shell 120, and the bottom shell 130 are enclosed to form an accommodating chamber 101; a cable accommodating slot 102 is further provided in the accommodating chamber 101;

at least one stretchable cable assembly 200, wherein the stretchable cable assembly 200 is arranged in the cable accommodating slot 102; the annular shell 110 is provided with a cable outlet hole 103; a cable 210 of the stretchable cable assembly 200 extends or retracts along the cable outlet hole 103; and a charging head assembly 300, wherein the charging head assembly 300 is arranged in the accommodating chamber 101; the charging head assembly 300 is electrically connected to the stretchable cable assembly 200; and a plug 310 of the charging head assembly 300 is configured to be plugged into a socket.

By the arrangement of the above structure, during use, the plug 310 of the charging head assembly 300 is plugged into the socket to achieve electrical connection with a mains supply. Pulling a cable 210 of the stretchable cable assembly 200 to thread out the cable 210 along the cable outlet hole 103 can extend the cable 210 and facilitate use, and the cable is connected to a mobile terminal or another device to charge the mobile terminal or the another device. During storage, the cable 210 of the stretchable cable assembly 200 retracts along the cable outlet hole 103, which can effectively store the cable 210, reduce the volume of the product, and facilitate storage by a user. The problems of cable damage and potential safety hazard caused by a disordered environment and cable winding because of a long cable are avoided.

As an improvement of the present disclosure, the stretchable cable assembly 200 includes a cable shell 220, a fixed PCB 230, a rotary PCB 240, and a cable 210; the rotary PCB 240 is connected to the cable shell 220; the cable 210 is wound around the cable shell 220; a connecting end of the cable 210 is electrically connected to the rotary PCB 240; a free end of the cable 210 extends or retracts along the cable outlet hole 103; the rotary PCB 240 is electrically connected to the fixed PCB 230; the fixed PCB 230 is electrically connected to the charging head assembly 300; and when the cable 210 extends or retracts along the cable outlet hole 103, the cable shell 220 and the rotary PCB 240 rotate relative to the fixed PCB 230. By the arrangement of the above structure, during use, the cable 210 of the stretchable cable assembly 200 is pulled to be threaded out along the cable outlet hole 103, thereby driving the cable shell 220 to rotate. The rotary PCB 240 rotates with the cable shell 220 and rotates relative to the fixed PCB 230. The rotary PCB 240 is electrically connected to the fixed PCB 230, and the fixed PCB 230 is electrically connected to the charging head assembly 300 to ensure stable electrical connection and improve the stability of the product.

As an improvement of the present disclosure, the stretchable cable assembly 200 further includes an elastic member 250; the annular shell 110 is provided with a connecting column 111; the cable shell 220 is provided with an elastic member accommodating slot 201 in the middle; the elastic member 250 is arranged in the elastic member accommodating slot 201; one end of the elastic member 250 is connected to the connecting column 111, and the other end of the elastic member 250 is connected to the cable shell 220; and an elastic restoring force of the elastic member 250 drives the cable shell 220 to rotate, so that the cable 210 has a movement trend of retraction along the cable outlet hole 103. By the arrangement of the above structure, when a user pulls the cable 210 of the stretchable cable assembly 200, the cable 210 is threaded out along the cable outlet hole 103, thereby driving the cable shell 220 to rotate, so that the elastic member 250 deforms and stores elastic potential energy. When the user releases the cable 210, the elastic member 250 is reset, thereby driving the cable shell 220 to rotate, so that the cable 210 has the movement trend of retraction along the cable outlet hole 103, and the cable 210 can automatically retract to facilitate use.

As an improvement of the present disclosure, the stretchable cable assembly 200 further includes an elastic member cover plate 260; and the elastic member cover plate 260 is detachably connected to the cable shell 220 and covers the elastic member accommodating slot 201. By the arrangement of the above structure, the elastic member cover plate 260 covers the elastic member accommodating slot 201, which can fix the elastic member 250 in the elastic member accommodating slot 201, prevent the elastic member 250 from being detached, ensure stable operation of the product, and make the product more durable.

As an improvement of the present disclosure, the shell 100 includes a friction block 140; the surface shell 120 and/or the bottom shell 130 are provided with a friction piece accommodating slot 104; the friction block 140 is arranged in the friction piece accommodating slot 104; and the friction block 140 resists against a surface of the elastic member cover plate 260. By the arrangement of the above structure, when the cable shell 220 rotates, the friction block 140 rubs against a surface of the elastic member cover plate 260, which can reduce the rotation speed of the cable shell 220, so that the cable 210 can slowly and stably extend or retract. The user experience is enhanced, and the fault rate of the product is reduced.

Due to the arrangement of the elastic member 250, without an external force, for example, when a user releases the cable 210, the cable 210 will automatically retract. However, if the cable 210 automatically retracts in a charging state, it is obviously not conducive to charging. Therefore, a locking mechanism is arranged to prevent the cable 210 from retracting when it does not need to retract. The locking mechanism only needs to be able to prevent the cable 210 from automatically retracting when the cable 210 extends to a desired length. A specific structure of the locking mechanism will be explained below.

As an improvement of the present disclosure, the charger further includes a locking member 400; the locking member 400 is rotatably connected to a bottom wall of the cable accommodating slot 102; an edge convex block 222 and an inner convex block 223 are arranged on one side of the cable shell 220 facing the bottom wall of the cable accommodating slot 102; a track 202 is formed between the edge convex block 222 and the inner convex block 223; and a free end of the locking member 400 is plugged into the track 202 and slides or is positioned in the track 202. By the arrangement of the above structure, the locking member 400 is rotatably connected to the bottom wall of the cable accommodating slot 102. When the length of the cable 210 needs to be fixed, the locking member 400 is rotated to a locking position, and the free end of the locking member 400 is clamped to a clamping position in the track 202, achieving the positioning in the track 202 and hindering the cable 210 from retracting along the cable outlet hole 103 under the action of the elastic member 250. When the length of the cable 210 needs to be extended or adjusted, the locking member 400 is rotated to an unlocking position, the free end of the locking member 400 is detached from the clamping position in the track 202 to allow the free end of the locking member 400 to slide in the track 202 and to allow the cable 210 to extend or retract.

As an improvement of the present disclosure, a guide convex block 224 and a locking convex block 225 are further arranged on one side of the cable shell 220 facing the bottom wall of the cable accommodating slot 102; the guide convex block 224 and the locking convex block 225 are spaced apart from each other; the guide convex block 224 and the locking convex block 225 divide the track 202 into an outer track 202a and an inner track 202b; and the free end of the locking member 400 slides in the outer track 202a and/or the inner track 202b.

As an improvement of the present disclosure, a clamping slot 203 is provided at a rear end of the locking convex block 225; when the elastic restoring force of the elastic member 250 drives the cable shell 220 to rotate, so as to enable the cable 210 to retract along the cable outlet hole 103; and the free end of the locking member 400 slides into the clamping slot 203 along the outer track 202a, to hinder the cable 210 from retracting along the cable outlet hole 103. By the arrangement of the above structure, during use, the elastic restoring force drives the cable shell 220 to rotate, and the free end of the locking member 400 slides in the outer track 202a until it slides into the clamping slot 203. In this case, the free end of the locking member 400 is fixedly connected to the clamping slot 203, so that the cable shell 220 is fixed relative to the cable accommodating slot 102, thereby fixing the length of the cable 210 and facilitating use.

As an improvement of the present disclosure, a first guide portion 204 is arranged at a front end of the guide convex block 224; the first guide portion 204 is arranged in a manner of facing the clamping slot 203; and when the cable 210 extends along the cable outlet hole 103 under the action of an external force, the first guide portion 204 is in contact with the free end of the locking member 400 to drive the free end of the locking member 400 to slide from the clamping slot 203 to the inner track 202b. By the arrangement of the above structure, the cable 210 is pulled to extend along the cable outlet hole 103. In this case, the free end of the locking member 400 slides out along the clamping slot 203 and into the inner track 202, so that the cable 210 can freely extend or retract for ease of use.

As an improvement of the present disclosure, a gap is formed between a rear end of the guide convex block 224 and a front end of the locking convex block 225; an outer edge of the inner convex block 223 protrudes out of a front side of the gap to form a second guide portion 205; and when the cable 210 extends along the cable outlet hole 103 under the action of the external force, the second guide portion 205 is in contact with the free end of the locking member 400 to drive the free end of the locking member 400 to slide from the inner track 202b to the outer track 202a. By the arrangement of the above structure, the cable 210 is continuously pulled, causing the free end of the locking member 400 to continuously slide along the inner track 202b and into the outer track 202a, thereby returning to its initial position, so that the cable shell 220 can rotate relative to the cable accommodating slot 102, and it is convenient for the adjustment of the length of the cable 210.

As an improvement of the present disclosure, the charging head assembly 300 includes a power PCB 320 and a plug 310; the power PCB 320 is electrically connected to the fixed PCB 230 through a PIN 330; and the plug 310 is electrically connected to the power PCB 320. By the arrangement of the above structure, during use, plug 310 is plugged into a socket and is electrically connected to the power PCB 320. The power PCB 320 achieves voltage adjustment, rectification, and other functions and transmits electrical energy to the fixed PCB 230. A mobile terminal is charged through the rotary PCB 240 and the cable 210.

As an improvement of the present disclosure, the charging head assembly 300 further includes a mounting seat 340; and the plug 310 is rotatably mounted on the mounting seat 340. By the arrangement of the above structure, during use, the plug 310 rotates out along the mounting seat 340 to be exposed, making it convenient for a user to plug the plug 310 into a mains supply. During storage, the plug 310 is driven and stored into the mounting seat 340, which can effectively protect the plug 310 and prolong the service life of the product.

As an improvement of the present disclosure, several conductive spring pieces 241 are arranged on the rotary PCB 240; the conductive spring pieces 241 are arranged radially along the cable shell 220; concentric circular-ring-shaped conductive contacts 231 are arranged on the fixed PCB 230; and the conductive spring pieces 241 resist against and are electrically connected to the conductive contacts 231. By the arrangement of the above structure, when the rotary PCB 240 rotates relative to the fixed PCB 230, the conductive spring pieces 241 are in continuous contact with the circular-ring-shaped conductive contacts 231 to ensure the stability of the electrical connection therebetween.

As an improvement of the present disclosure, the charging head assembly 300 further includes an output terminal 350; and the output terminal 350 is configured to allow insertion and use of a USB cable. By the arrangement of the above structure, during use, a user can connect another USB cable to the output terminal 350. The output terminal 350 is electrically connected to the power PCB 320, thereby achieving a function of charging another mobile terminal or another device through the USB cable. Therefore, when a data interface of the charger is not matched with the USB cable or the number of data interfaces of the charger is not sufficient, the another mobile terminal or device can be still charged through the charger. Furthermore, use of an original USB cable is more favorable for improving the charging efficiency and prolonging the service life of a mobile device.

Data connectors 270 arranged at end portions of the cables 210 of the various stretchable cable assemblies 200 are different. As shown in FIG. 1, each data connector 270 can be one of a Type-c connector, a USB connector, or a Lighting connector to meet the charging needs of mobile terminals or other devices with different charging interfaces and improve the adaptability of the product. In addition, a plurality of devices can be simultaneously charged, which facilitates use and improves the charging efficiency.

As an improvement of the present disclosure, the annular shell 110 is provided with a cable accommodating slot 105 at a position close to the cable outlet hole 103; and the cable accommodating slot 105 is configured to accommodate the data connector 270 and a portion of the cable 210. By the arrangement of the above structure, the data connector 270 and a portion of the cable 210 are accommodated in the cable accommodating slot 105, which can store the data connector 270 at the end portion of the cable 210, to prevent the data connector 270 from being contaminated and damaged.

As an improvement of the present disclosure, a clamping gap 106 is provided at a top of the connecting column 111; a mounting block 107 is arranged on a side wall of the elastic member accommodating slot 201; the elastic member 250 is a coil spring; a first end of the coil spring is plugged into the clamping gap 106; and a second end of the coil spring sleeves the mounting block 107. By the arrangement of the above structure, the coil spring is cheap. It is more convenient and stable when the coil spring is connected to the clamping gap 106 and the mounting block 107.

Referring to FIG. 9 to FIG. 16, a charger according to a second embodiment of the present disclosure is disclosed, including:

a shell 100, wherein the shell 100 includes an annular shell 110, a surface shell 120 arranged at a top of the annular shell 110, and a bottom shell 130 arranged at a bottom of the annular shell 110; the annular shell 110, the surface shell 120, and the bottom shell 130 are enclosed to form an accommodating chamber 101; a cable accommodating slot 102 is further provided in the accommodating chamber 101;

a stretchable cable assembly 200, wherein the stretchable cable assembly 200 is arranged in the cable accommodating slot 102; the annular shell 110 is provided with a cable outlet hole 103; a cable 210 of the stretchable cable assembly 200 extends or retracts along the cable outlet hole 103; and a charging head assembly 300, wherein the charging head assembly 300 is arranged in the accommodating chamber 101; the charging head assembly 300 is electrically connected to the stretchable cable assembly 200; and a plug 310 of the charging head assembly 300 is configured to be plugged into a socket.

By the arrangement of the above structure, during use, the plug 310 of the charging head assembly 300 is plugged into the socket to achieve electrical connection with a mains supply. Pulling a cable 210 of the stretchable cable assembly 200 to thread out the cable 210 along the cable outlet hole 103 can extend the cable 210 and facilitate use, and the cable is connected to a mobile terminal or another device to charge the mobile terminal or the another device. During storage, the cable 210 of the stretchable cable assembly 200 retracts along the cable outlet hole 103, which can effectively store the cable 210, reduce the volume of the product, and facilitate storage by a user. The problems of cable damage and potential safety hazard caused by a disordered environment and cable winding because of a long cable are avoided. In this embodiment, there is only one stretchable cable assembly 200.

As an improvement of the present disclosure, a data connector 270 is arranged at an end portion of the cable 210; the data connector 270 includes a first connector 271 and a second connector 272 that is plugged into the first connector 271; a first end of the first connector 271 is connected to the end portion of the cable 210; a second end of the first connector 271 is one of a Type-c connector or a Lighting connector; a first end of the second connector 272 is provided with an interface slot adapted to the second end of the first connector 271; and a second end of the second connector 272 is the other one of the Type-c connector or the Lightning connector. By the arrangement of the above structure, a user can use the first connector 271 or the second connector 272 to charge mobile terminals with different interfaces, thereby improving the adaptability of the product, facilitating the user to freely select the charging interface, and providing a better user experience.

Figure 16:
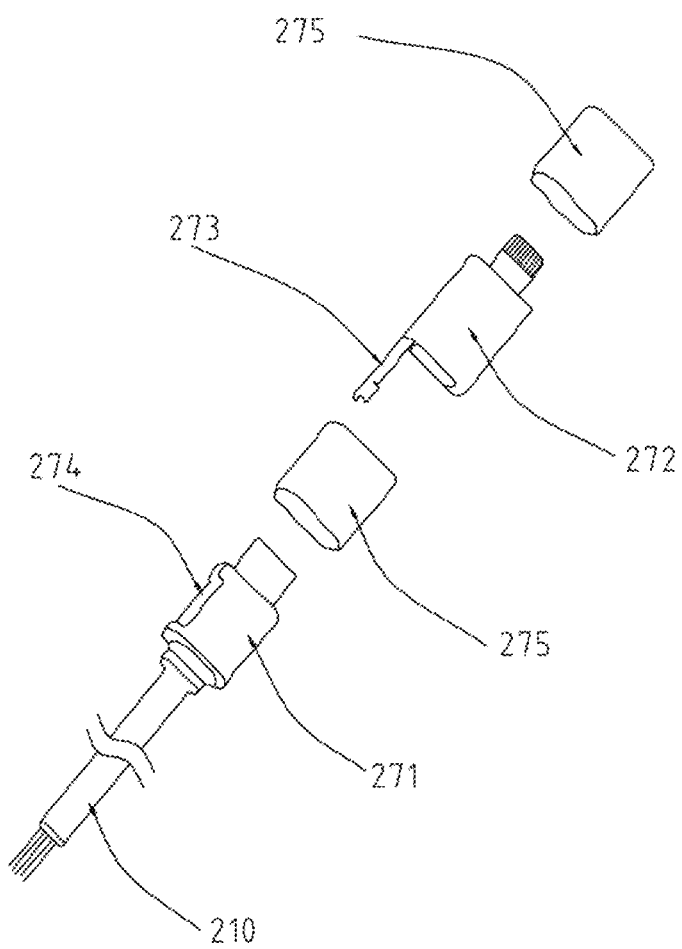
FIG. 16 is a schematic diagram of an exploded structure of a data connector according to the present disclosure.

In the second embodiment, there is only one stretchable cable assembly 200. To charge the mobile terminals and other devices with different interfaces, different connectors need to be used to achieve electrical connection. As shown in FIG. 16, the first connector 271 is a Type-c connector. When an interface slot of a mobile terminal is a Type-c interface, the first connector 271 is used to be plugged into the interface slot of the mobile terminal, which can charge the mobile terminal. When the interface slot of the mobile terminal is a Lighting interface, the second connector 272 sleeves the first connector 271 and is plugged into the interface slot of the mobile terminal to achieve electrical connection with a device with a Lighting interface, thereby improving the adaptability of the product.

As an improvement of the present disclosure, the first connector 271 and the second connector 272 are connected by a connecting arm 273; the first connector 271 is provided with a connecting slot 274 configured to accommodate the connecting arm 273, so that the connecting arm 273 can slide in the connecting slot 274. By the arrangement of the above structure, the connecting arm 273 is connected to the connecting slot 274 and slides in the connecting slot 274, which can achieve the connection of the first connector 271 and the second connector 272 and prevent the loss of the second connector 272. Meanwhile, a distance between the second connector 272 and the first connector 271 can be adjusted, making it convenient for a user to connect the first connector 271 to the mobile terminal.

As an improvement of the present disclosure, the data connector further includes an encloser 275 that sleeves the first connector 271 and the second connector 272; and the encloser 275 that sleeves the first connector 271 wraps the connecting arm 273. By the arrangement of the above structure, the encloser 275 sleeves the first connector 271 and the connecting arm 273, which can improve the stability of the product and prevent the connecting arm 273 from being detached from the connecting slot 274.

The above shows one or more implementations provided in combination with specific contents, and it is not deemed that the specific implementations of the present disclosure is limited to these explanations. Any technical inferences or replacements that are similar or identical to the method and structure of the present disclosure or made under the idea of the present disclosure shall fall within the protection scope of the present disclosure.

What is claimed is:

1. A charger, comprising:

a shell (100), wherein the shell (100) comprises an annular shell (110), a surface shell (120) arranged at a top of the annular shell (110), and a bottom shell (130) arranged at a bottom of the annular shell (110); the annular shell (110), the surface shell (120), and the bottom shell (130) are enclosed to form an accommodating chamber (101); a cable accommodating slot (102) is further provided in the accommodating chamber (101);

at least one stretchable cable assembly (200), wherein the stretchable cable assembly (200) is arranged in the cable accommodating slot (102); the annular shell (110) is provided with a cable outlet hole (103); a cable (210) of the stretchable cable assembly (200) extends or retracts along the cable outlet hole (103);

a charging head assembly (300), wherein the charging head assembly (300) is arranged in the accommodating chamber (101); the charging head assembly (300) is electrically connected to the stretchable cable assembly (200); and a plug (310) of the charging head assembly (300) is configured to be plugged into a socket; and a locking member (400), wherein the locking member (400) is rotatably connected to a bottom wall of the cable accommodating slot (102);

wherein the stretchable cable assembly (200) further comprises a cable shell (220), a fixed printed circuit board (PCB) (230), and a rotary PCB (240); the rotary PCB (240) is connected to the cable shell (220); the cable (210) is wound around the cable shell (220) a connecting end of the cable (210) is electrically connected to the rotary PCB (240); a free end of the cable (210) extends or retracts along the cable outlet hole (103); the rotary PCB (240) is electrically connected to the fixed PCB (230); the fixed PCB (230) is electrically connected to the charging head assembly (300);

when the cable (210) extends or retracts along the cable outlet hole (103), the cable shell (220) and the rotary PCB (240) rotate relative to the fixed PCB (230);

wherein the stretchable c able assembly (200) further comprises an elastic member (250); the annular shell (110) is provided with a connecting column (111); the cable shell (220) is provided with an elastic member accommodating slot (201) in the middle; the elastic member (250) is arranged in the elastic member accommodating slot (201); one end of the elastic member (250) is connected to the connecting column (111), and the other end of the elastic member (250) is connected to the cable shell (220); and an elastic restoring force of the elastic member (250) drives the cable shell (220) to rotate, so that the cable (210) has a movement trend of retraction along the cable outlet hole (103);

wherein an edge convex block (222) and an inner convex block (223) are arranged on one side of the cable shell (220) facing the bottom wall of the cable accommodating slot (102), a track (202) is formed between the edge convex block (222) and the inner convex block (223); and a free end of the locking member (400) is plugged into the track (202) and slides or is positioned in the track (202);

wherein a guide convex block (224) and a locking convex block (225) are further arranged on one side of the cable shell (220) facing the bottom wall of the cable accommodating slot (102); the guide convex block (224) and the locking convex block (225) are spaced apart from each other; the guide convex block (224) and the locking convex block (225) divide the track (202) into an outer track (202*a*) and an inner track (202*b*); and the free end of the locking member (400) slides in the outer track (202*a*) and/or the inner track (202*b*).

2. The charger according to claim 1, wherein the stretchable cable assembly (200) further comprises an elastic member cover plate (260); and the elastic member cover plate (260) is detachably connected to the cable shell (220) and covers the elastic member accommodating slot (201).

3. The charger according to claim 2, wherein the shell (100) comprises a friction block (140); the surface shell (120) and/or the bottom shell (130) are provided with a friction piece accommodating slot (104); the friction block (140) is arranged in the friction piece accommodating slot (104); and the friction block (140) resists against a surface of the elastic member cover plate (260).

4. The charger according to claim 1, wherein a clamping slot (203) is provided at a rear end of the locking convex block (225); when the elastic restoring force of the elastic member (250) drives the cable shell (220) to rotate, so as to enable the cable (210) to retract along the cable outlet hole (103); and the free end of the locking member (400) slides into the clamping slot (203) along the outer track (202A), to hinder the cable (210) from retracting along the cable outlet hole (103).

5. The charger according to claim 4, wherein a first guide portion (204) is arranged at a front end of the guide convex block (224); the first guide portion (204) is arranged in a manner of facing the clamping slot (203); and when the cable (210) extends along the cable outlet hole (103) under the action of an external force, the first guide portion (204) is in contact with the free end of the locking member (400) to drive the free end of the locking member (400) to slide from the clamping slot (203) to the inner track (202*b*).

6. The charger according to claim 5, wherein a gap is formed between a rear end of the guide convex block (224) and a front end of the locking convex block (225); an outer edge of the inner convex block (223) protrudes out of a front side of the gap to form a second guide portion (20S); and when the cable (210) extends along the cable outlet hole (103) under the action of the external force, the second guide portion (205) is in contact with the free end of the locking member (400) to drive the free end of the locking member (400) to slide from the inner track (202*b*) to the outer track (202A).

7. The charger according to claim 1, wherein the charging head assembly (300) comprises a power PCB (320) and a plug (310); the power PCB (320) is electrically connected to the fixed PCB (230) through a PIN (330); and the plug (310) is electrically connected to the power PCB (320).

8. The charger according to claim 7, wherein the charging head assembly (300) further comprises a mounting seat (340); and the plug (310) is rotatably mounted on the mounting seat (340).

9. The charger according to claim 1, wherein several conductive spring pieces (241) are arranged on the rotary PCB (240); the conductive spring pieces (241) are arranged radially along the cable shell (220); concentric circular-ring-shaped conductive contacts (231) are arranged on the fixed PCB (230); and the conductive spring pieces (241) resist against and are electrically connected to the conductive contacts (231).

10. The charger according to claim 7, wherein the charging head assembly (300) further comprises an output terminal (350); and the output terminal (350) is configured to allow insertion and use of a USB cable.

11. The charger according to claim 1, wherein a data connector (270) is arranged at an end portion of the cable (210); the data connector comprises a first connector (271) and a second connector (272) that is plugged into the first connector (271); a first end of the first connector (271) is connected to the end portion of the cable (210); a second end of the first connector (271) is one of a Type-c connector or a Lighting connector; a first end of the second connector (272) is provided with an interface slot adapted to the second end of the first connector (271); and a second end of the second connector (272) is the other one of the Type-c connector or the Lightning connector.

12. The charger according to claim 11, wherein the first connector (271) and the second connector (272) are connected by a connecting arm (273); the first connector (271) is provided with a connecting slot (274) configured to accommodate the connecting arm (273), so that the connecting arm (273) is able to slide in the connecting slot (274).

13. The charger according to claim 12, wherein the data connector further comprises an encloser (275) that sleeves the first connector (271) and the second connector (272); and the encloser (275) that sleeves the first connector (271) wraps the connecting arm (273).

14. The charger according to claim 11, wherein the annular shell (110) is provided with a cable accommodating slot (105) at a position close to the cable outlet hole (103);

and the cable accommodating slot (105) is configured to accommodate the data connector (270) and a portion of the cable (210).

15. The charger according to claim 1, wherein a clamping gap (106) is provided at a top of the connecting column (111); a mounting block (107) is arranged on a side wall of the elastic member accommodating slot (201); the elastic member (250) is a coil spring; a first end of the coil spring is plugged into the clamping gap (106); and a second end of the coil spring sleeves the mounting block (107).

* * * * *